United States Patent [19]
Holle et al.

[11] 4,181,642
[45] Jan. 1, 1980

[54] PROCESS FOR THE PRODUCTION OF A GLYCIDYL GROUP CONTAINING ACRYLIC RESIN AND ITS USE

[75] Inventors: Hans-Joachem Hölle; Gerhard Morlock, both of Hanau, Fed. Rep. of Germany

[73] Assignee: Deutsche Gold- und Silber-Scheideanstalt vormals Roessler, Frankfurt, Fed. Rep. of Germany

[21] Appl. No.: 946,059

[22] Filed: Sep. 25, 1978

[30] Foreign Application Priority Data

Nov. 5, 1977 [DE] Fed. Rep. of Germany ....... 2749576

[51] Int. Cl.² ...................... C08F 8/14; C08F 220/14; C08F 220/32; C08L 00/00
[52] U.S. Cl. .................. 260/37 EP; 260/17.4 UC; 260/42.28; 428/463; 428/500; 526/193; 526/273; 525/329; 525/379; 525/386; 525/170
[58] Field of Search ................ 526/16, 273, 193; 260/42.28, 37 EP

[56] References Cited
U.S. PATENT DOCUMENTS

| | | | |
|---|---|---|---|
| 3,525,721 | 8/1970 | Jorgensen | 526/193 |
| 3,845,010 | 10/1974 | Labana et al. | 526/273 |
| 3,865,904 | 2/1975 | Wingler et al. | 526/273 |
| 4,051,194 | 9/1977 | Ishikawa et al. | 526/273 |

Primary Examiner—Harry Wong, Jr.
Attorney, Agent, or Firm—Cushman, Darby & Cushman

[57] ABSTRACT

There are prepared powder enamels or varnishes containing an acrylic resin in combination with an aliphatic dicarboxylic acid. The acrylic resin has glycidyl groups and is prepared by bulk polymerizing a mixture of:
(a) methyl methacrylate, 20 to 70 weight %;
(b) at least one ester of acrylic acid or methacrylic acid with a monohydric alcohol, whose homopolymer has a glass transition temperature below 40° C., 10 to 40 weight %;
(c) glycidyl acrylate or glycidyl methacrylate, 10 to 25 weight %; and
(d) an additional monomer copolymerizable with (a), (b) and (c), 0 to 50 weight %;

in the presence of a radical (free radical) catalyst and in the presence of, based on the weight of the monomer mixture of 0.1 to 3.0 weight percent of at least one ester of phosphorous acid having the formula:

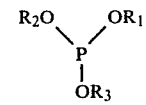

where $R_1$ is hydrogen or a saturated aliphatic group with 1 to 16 carbon atoms, an aryl group with 6 to 10 carbon atoms, an alkyl substituted aryl with 1 to 12 carbon atoms in the alkyl, or an aralkyl group with 7 to 18 carbon atoms and $R_2$ and $R_3$ are the same or different saturated aliphatic groups with 1 to 16 carbon atoms, aryl groups with 6 to 10 carbon atoms, alkyl substituted aryl with 1 to 12 carbon atoms in the alkyl, or aralkyl groups with 7 to 18 carbon atoms.

24 Claims, No Drawings

PROCESS FOR THE PRODUCTION OF A GLYCIDYL GROUP CONTAINING ACRYLIC RESIN AND ITS USE

BACKGROUND OF THE INVENTION

Powder enamel (or varnish or lacquer) binders based on glycidyl group containing acrylic resins and aliphatic dicarboxylic acids are known (e.g., see Hirota German OS Nos. 2,064,916, Kamimura German OS 2,214,650, Labana German OS 2,240,312 and Katsimbas German OS 2,424,809). The production of the acrylic resin generally takes place by solution polymerization, suspension polymerization or by a combined bulk/suspension polymerization process. The use of the simpler and more economical bulk polymerization process is prohibited by the fact that it has not been possible to carry out the polymerization to a high degree of conversion and to obtain a polymerizate with a low content of residual monomers without removing residual monomers in an additional step.

The cross-linking, i.e., the reaction between the acrylic resin and the dicarboxylic acid, takes place with the known agents in the absence of a catalyst. In that case relatively long baking times and relatively high baking temperatures are required. Alternatively the cross-linking takes place in the presence of a catalyst which must be worked into the binder subsequently in an additional process step, for the most part in the form of a "master-batch" or an adduct.

SUMMARY OF THE INVENTION

The object of the present invention is the development of a process for the production of a glycidal group containing acrylic resin suitable for admixture with aliphatic dicarboxylic acids, e.g., alkanedioic acids, to form a powder enamel (or lacquer or varnish) binder. The acrylic resin is prepared by bulk polymerizing a mixture of:
(a) methyl methacrylate, 20 to 70 weight %;
(b) at least one ester of acrylic acid or methacrylic acid with a monohydric alcohol, whose homopolymer has a glass transition temperature below 40° C., 10 to 40 weight %;
(c) glycidyl acrylate or glycidyl methacrylate, 10 to 25 weight %; and
(d) an additional monomer copolymerizable with (a), (b) and (c), 0 to 50 weight %;
in the presence of a radical (free radical) catalyst and in the presence of, based on the weight of the monomer mixture of 0.1 to 3.0 weight percent of at least one ester of phosphorous acid having the formula:

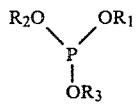

where $R_1$ is hydrogen or a saturated aliphatic group with 1 to 16 carbon atoms, an aryl group with 6 to 10 carbon atoms, alkyl substituted aryl with 1 to 12 carbon atoms in the alkyl, or an aralkyl group with 7 to 18 carbon atoms and $R_2$ and $R_3$ are the same or different saturated aliphatic groups with 1 to 16 carbon atoms, aryl groups with 6 to 10 carbon atoms, alkyl substituted aryl with 1 to 12 carbon atoms in the alkyl, or aralkyl groups with 7 to 18 carbon atoms.

Preferably the phosphorous acid ester is used in an amount of 0.2 to 1.0 weight percent based on the weight of the monomer mixture. It can be added to the monomer mixture before the polymerization or also in the course of the polymerization. The latter variant is particularly advantageous if the polymerization is undertaken in several steps.

The phosphorous acid esters display a twofold advantageous effect. For one they make possible an increased conversion in the polymerization. Thus there is obtained a polymerizate with reduced content of residual monomer. And the other effect is they represent very effective catalysts for the later cross-linking with the aliphatic dicarboxylic acids. They are present after the polymerization in completely homogeneous distribution in the acrylic resin formed and after mixing with the dicarboxylic acids they are therefore also completely homogeneously distributed in the finished binder, i.e., the powder enamel (or lacquer or varnish), and hence there is no additional expense, for example for the production of a "master-batch".

A further object of the invention therefore is the use of the acrylic resin produced in accordance with the process of the invention in combination with aliphatic dicarboxylic acids as a powder enamel (varnish or lacquer) binder.

The monomer mixture added by the process of the invention is composed of:
(a) 20 to 70 weight percent, preferably 40 to 65 weight percent of methyl methacrylate;
(b) 10 to 40 weight percent, preferably 15 to 30 weight percent of at least one ester of acrylic or methacrylic acid with a monohydric alcohol, whose homopolymerizate has a glass transition temperature below 40° C. Preferably there is used n-butyl acrylate or n-butyl methacrylate. Further examples of suitable acrylates and methacrylates are ethyl acrylate, 2-methoxyethyl acrylate, 2-ethoxyethyl acrylate, 2-methoxyethyl methacrylate, 2-ethoxyethyl methacrylate, isobutyl methacrylate, 2-ethylhexyl acrylate, lauryl methacrylate, stearyl methacrylate or cyclohexyl acrylate;
(c) 10 to 25 weight percent, preferably 15 to 20 weight percent, of glycidyl acrylate or glycidyl methacrylate. Preferably there is used glycidyl methacrylate;
(d) 0 to 50 weight percent, preferably at most 25 weight percent of another monomer copolymerizable with components (a) to (c). Examples of such monomers are styrene, alpha-methylstyrene, acrylonitrile, ethyl methacrylate, hydroxyalkyl acrylates and methacrylates such as 2-hydroxyethyl acrylate, 2-hydroxyethyl methacrylate, 2-hydroxypropyl methacrylate, 4-hydroxybutyl methacrylate, 2-hydroxypropyl acrylate or 4-hydroxybutyl acrylate.

It is suitable to carry out the polymerization of the monomer mixture in the presence of 0.5 to 4.0 weight percent, preferably 1.5 to 2.5 weight percent, of at least one known chain transfer agent or chain regulator for vinyl polymerization. Examples of such chain regulators are mercaptans such as octyl mercaptan, n-dodecyl mercaptan, tert. dodecyl mercaptan, cetyl mercaptan, stearyl mercaptan, thioglycolic acid; esters of thioglycolic acid with mono- to tetrahydric alcohols such as butyl alcohol, hexyl alcohol, octyl alcohol, isooctyl alcohol, ethylene glycol, 1,2-propylene glycol, 1,3-propylene glycol, 1,2-butylene glycol, 1,3-butylene glycol, 1,4-butylene glycol, glycerol, trimethylolpropane, pentaerythritol or di, tri or tetraethylene glycol.

The polymerization of the monomer mixture is carried out in bulk. It can take place in one step or in several steps. Especially suitable for example is the use of a two step process wherein there is produced in the first step at a temperature between about 60° and about 120° C. a syrupy prepolymerizate having a viscosity, for example of about 1000 mPas which is hardened in a second step by bulk polymerization discontinuously in shallow individual molds or also continuously, e.g., in a tubular mold constructed from plastic or between two endless steel belts, in layers having a thickness of from several millimeters to at most several centimeters at temperatures between about 70° and about 100° C. Thereby sufficient removal of the heat set free in the polymerization should be provided for through an air or water bath. In some cases it is advantageous to employ higher temperatures of about 100° to about 120° C. in the last stage of the polymerization. The ester of phosphorous acid in this two step polymerization can be added to the monomer mixture or to the syrupy prepolymerizate.

As polymerization catalysts there can be used the known radical (i.e., free radical generating) catalysts, especially peroxides and azo compounds with decomposition temperatures below 100° C. For example there can be mentioned tert-butyl perpivalate, tert-butyl perisobutyrate, tert-butyl permaleate, tert-butyl peroctoate, benzoyl peroxide, monochlorobenzoyl peroxide, dichlorobenzoyl peroxide, diacetyl peroxide, lauroyl peroxide, cyclohexanone hydroperoxide, diisopropyl peroxydicarbonate, cyclohexyl peroxydicarbonate, diisooctyl peroxydicarbonate, acetyl isopropylsulfonyl peroxide, azobis-isobutyronitrile or azobis-(2,4-dimethyl) valeronitrile. Under certain circumstances it can be advantageous to use mixtures of different polymerization catalysts.

As phosphite esters suitable for use in the process of the invention there can be used for example dimethyl phosphite, dibutyl phosphite, dilauryl phosphite, diphenyl phosphite, dinaphthyl phosphite, di(nonylphenyl) phosphite (e.g., di-(p-nonylphenyl) phosphite), methyl octyl phosphite, cetyl phenyl phosphite, trimethyl phosphite, tributyl phosphite, tris decyl phosphite, tricetyl phosphite, triphenyl phosphite, trinaphthyl phosphite, tris (nonylphenyl) phosphite (e.g., tris (p-nonylphenyl) phosphite), didecyl phenyl phosphite, methyl decyl phenyl phosphite, diethyl phosphite, triethyl phosphite, di p-cresyl phosphite, tri-p-cresyl phosphite, di-o-cresylphosphite, di-m-cresyl phosphite, tri-o-cresyl phosphite, dicetyl phosphite, tricetyl phosphite, dibenzyl phosphite, tribenzyl phosphite, tris (dodecylphenyl) phosphite, dibenzyl phosphite, dimethyl benzyl phosphite, tris phenethyl phosphite, tris (p-methylbenzyl) phosphite, tri n-butyl phosphite. Preferably there are used the neutral triesters of phosphorous acid, especially preferred is triphenyl phosphite.

If the polymerization of the mixture of monomers is carried out in the presence of the mentioned amounts of chain regulators the average molecular weight (number average) of the acrylic resin lies between about 3000 and about 30,000, especially between about 5000 and about 20,000. Their melt viscosity index [MFI 125/2; DIN 53735 (German Industrial Standard)] lies between about 2 and about 50 grams/10 min., especially between about 5 and about 15 g/10 min.

The resins then have viscosity numbers (eta-i-values) of 0.06 to 0.25 dl/g, especially from 0.10 to 0.15 dl/g, measured at 20° C. in a 1:1 mixture of dimethyl formamide and toluene.

The epoxide equivalent weight of the acrylic resins produced by the process of the invention lies between about 500 and about 1,400, especially between about 600 and about 1,000. They possess a glass transition temperature between about 30° and about 80° C., especially between about 35° and about 60° C.

The acrylic resins having glycidyl groups produced by the process of the invention are mixed with saturated, straight chain aliphatic dicarboxylic acids, e.g., alkanedioic acids, which contain 4 to 20 carbon atoms per molecule, to produce powder varnish (enamel or lacquer) binders. Examples of such dicarboxylic acids include adipic acid, pimelic acid, suberic acid, azelaic acid, sebacic acid, undecane-1,11-dicarboxylic acid, dodecane-1,12-dicarboxylic acid, succinic acid, glutaric acid, hexadecane-1,16-dicarboxylic acid and octadecane-1,18-dicarboxylic acid. Preferably there are used dicarboxylic acids with 7–14 carbon atoms. Particularly preferred are sebacic acid and dodecane-1,12-dicarboxylic acid.

In the finished powder lacquer (or varnish or enamel) binders the ratio of the glycidyl groups arising from the acrylic resin to the carboxyl groups of the dicarboxylic acid, or the dicarboxylic acids, in case these should be added as a mixture, should be between 0.8 and 1.4 to 1, preferably between 0.9 and 1.2 to 1. This generally is reached if 75 to 95 weight percent of an acrylic resin produced according to the process of the invention is admixed with 5 to 25 weight percent of at least one dicarboxylic acid.

To modify the properties of the final powder varnish binder in a given case there can also be added in a minor amount other known carboxyl group containing crosslinking agents or their anhydrides. As examples there can be mentioned saturated branched or unsaturated straight or branched chain polybasic carboxylic acids or their anhydrides such as maleic acid, maleic anhydride, fumaric acid, muconic acid, dihydromuconic acid, itaconic acid, citraconic acid, saturated or unsaturated cycloaliphatic polybasic carboxylic acids such as cyclohexane-dicarboxylic acid or tricyclodecane dicarboxylic acid; amino acids, e.g. p-aminobenzoic acid, p-hydroxybenzoic acid, polymers with carboxyl groups such as for example by reaction of epoxide resins (e.g., bisphenol A-epichlorohyrin) with a dicarboxylic acid; e.g., maleic acid; polyesters, polyethers or polyamides containing carboxyl groups as end groups; as well as carboxyl group containing acrylic resins. However, these compounds should be added at most in such amounts that the carboxyl groups originating from these materials are present in an amount which is half the number present introduced through the saturated, straight chain, aliphatic dicarboxylic acids. For example, the pigment wetting power of the binder and the flexibility and the flow properties of the finished powder varnish can be influenced through this.

In a given case there can be added up to 15 percent by weight of at least one other known varnish (or lacquer or enamel) binder, e.g., cellulose acetate butyrate, as well as other customary components of varnishes (or lacquers or enamels) such as pigments, fillers, flatting (matting) agents, levelling agents, antistatic agents or surface active materials in the customarily used concentrations.

Finished bakable enamels (or varnishes or lacquers) are obtained if the acrylic resin with the dicarboxylic acid and pigments, e.g., the customary titanium dioxide pigments, and, in a given case further varnish (or lacquer or enamel) aids are homogenized in a kneader or extruder in the melt, e.g., at elevated temperatures between about 90° and about 140° C., the melt cooled and the solid mixture then ground to the desired particle size (for the most part less than 90μ).

After the formation of a sprayable powder the stoving (bakable) powder varnish (or lacquer or enamel) can be applied to suitable metal surfaces according to the customary methods of electrostatic spraying and stoved at temperatures of e.g., 170° to 200° C., thus it can be applied to iron, steel, aluminum, copper or tin surfaces. The baked varnish (or enamel or lacquer) films show good adhesion and good mechanical properties even on defatted but otherwise untreated steel sheets and also on other metals, as well as outstanding chemical resistance. Furthermore there is emphasized the very good resistance to salt water. The most prominent property however, is their outstanding resistance to weather.

Acrylic resins which were produced under otherwise equal conditions but in the absence of esters of phosphorus acid, show a higher content of non-polymerized components, the powder lacquers (or varnishes or enamels) produced from such acrylic resins show a greater tendency to form clumps at storage temperatures above 30° C. and undergo heavier losses of weight on baking. These powder varnishes (or lacquers or enamels stoved under corresponding conditions result in lacquer (or enamel or varnish) films with poorer mechanical properties and less chemical resistance. By increasing the stoving (or baking) temperature to above 200° C. it is true that these properties are improved to a certain extent, but such baking (or stoving) conditions are economically unfavorable and besides can lead to a yellowing of the lacquer (enamel or varnish).

Unless otherwise indicated all parts and percentages are by weight.

The composition can comprise, consist essentially of or consist of the materials set forth and the process can comprise, consist essentially of or consist of the steps set forth with such composition.

The invention is further explained with reference to the following examples:

DESCRIPTION OF THE PREFERRED EMBODIMENTS

EXAMPLE 1

(a) Production Of An Acrylic Resin

In a mixture of 40 parts by weight of methyl methacrylate, 25 parts by weight of n-butyl methacrylate, 8 parts by weight of n-butyl acrylate, 10 parts by weight of hydroxypropyl methacrylate and 17 parts by weight of glycidyl methacylate there were dissolved with heating 1.5 parts by weight of pentaerythritol tetrathioglycolate and 1.0 parts by weight of glycol dimercaptoacetate. The mixture was heated to 80° C. and the polymerization started by adding 0.07 parts by weight of azoisobutyronitrile. The reaction temperature was held by sub-atmospheric pressure to between 80° and 90° C. After about 40 to 60 minutes, there was formed a syrupy prepolymerizate. After cooling to about 30° C. this was treated with 0.5 parts by weight of triphenyl phosphite and with 0.8 parts by weight of 25% diacetyl peroxide solution (in dibutyl phthalate) and hardened in polyethylene films between metal plates in a layer thickness of about 1 cm in a water bath at 85° C. in about 1 hours. The clear polymerizate had a viscosity number eta-i (in dimethylformamide/toluene 1:1 by volume) of 0.115 dl/g and a melt viscosity index (MFI 125/2) of 12 g/10 min. The total residual monomer content according to gas chromatographic determination was below 1.0 weight percent.

(b) Mixing To Form A Powder Varnish 100 parts by weight of the acrylic resin produced according to (a) were mixed with 11 parts by weight of sebacic acid and 60 parts by weight of very finely divided, white titanium dioxide of the rutile type (produced by the chloride process). The powder mixture was subsequently homogenized for 1 minute at 120° to 135° C. in an extruder. The melt was quenched to room temperature and ground to a particle fineness below 90 microns. There resulted a powder which still had good free flowing properties at a storage temperature of 30° to 40° C.

(c) Application Of The Powder Varnish And Properties Of The Baked Varnish Films

The powder varnish was sprayed in a commercial powder spraying apparatus at a voltage of 60 kV on a 0.88 mm thick defatted steel test sheet and subsequently baked for 15 minutes at 180° C. object temperature. There resulted a yellowing-free coating having the following properties:

| | |
|---|---|
| Loss on baking (weight percent) | 1.0 |
| Cross cut test (DIN 53151) | 0 |
| Blend test (DIN 53152) | 4mm |
| Cupping test (Erichsen) (DIN 53156) | 7mm |
| Impact test (Erichsen) (350 kg; Model 223) | 2mm |
| Salt spray test (500 hours) (ASTM B 117-61) | Reduction in adhesion at the Andreas cross 2mm |
| Xenotest 150, % Gloss retention after 1000 hours | 95 |

Comparison Experiment 1 (Without Addition Of Triphenyl Phosphite)

(a) Production Of An Acrylic Resin

In a mixture of 40 parts by weight of methyl methacrylate, 25 parts by weight of n-butyl methacrylate, 8 parts by weight of n-butyl acrylate, 10 parts by weight of hydroxypropyl methacrylate and 17 parts by weight of glycidyl methacrylate there were dissolved with heating 1.5 parts by weight of pentaerythritol tetrathioglycolate and 1.0 parts by weight of glycol dimercaptoacetate. The mixture was heated to 80° C. and the polymerization started by adding 0.07 parts by weight of azoisobutyronitrile. The reaction temperature was held by sub-atmospheric pressure to between 80° and 90° C. After about 40 to 60 minutes, there was formed a syrupy prepolymerizate. After cooling to about 30° C. this was treated with 0.8 parts by weight of 25% diacetyl peroxide solution (in dibutyl phthalate) and hardened in polyethylene films between metal plates in a layer thickness of about 1 cm in a water bath at 85° C. in about 1 hour. The clear polymerizate had a viscosity number eta-i (in dimethylformamide/toluene 1:1 by volume) of 0.113 dl/g and a melt viscosity index (MFI 125/2) of 18 g/10 min. The total residual monomer content according to gas chromatographic determination was 1.8 weight percent.

(b) Mixing To Form A Powder Varnish 100 parts by weight of the acrylic resin produced according to (a) were mixed with 11 parts by weight of sebacic acid and 60 parts by weight of very finely divided, white titanium dioxide of the rutile type (produced by the chloride process). The powder mixture was subsequently homogenized for 1 minute at 120° to 135° C. in an extruder. The melt was quenched to room temperature and ground to a particle fineness below 90 microns. There resulted a powder which already had the tendency to form clumps at a storage temperature of 30° to 35° C.

(c) Application Of The Powder Varnish And Properties Of The Baked Varnish Films

The powder varnish was sprayed in a commercial powder spraying apparatus at a voltage of 60 kV on a 0.88 mm thick defatted steel test sheet and subsequently baked for 15 minutes at 180° C. object temperature. There resulted a yellowing-free coating having the following properties.

| Loss on baking (weight percent) | 1.8 |
| Cross cut test (DIN 53151) | 4 chipped off |
| Bend test (DIN 53152) | 8mm chipped off |
| Cupping test (Erichsen) (DIN 53156) | 4mm torn |
| Impact test (Erichsen) (120 kg; Model 223) | chipped off |
| Salt spray test (120 hours) (ASTM B 117-61) | film destroyed |

EXAMPLE 2

(a) Production Of An Acrylic Resin

In a mixture of 56 parts by weight of methyl methacrylate, 20 parts by weight of 2-ethyhexyl acrylate, 10 parts by weight of 2-hydroxypropyl methacrylate and 14 parts by weight of glycidyl acrylate there were dissolved with heating 2.0 parts by weight of glycol dimercaptoacetate. The mixture was heated to 80° C. and the polymerization started by adding 0.05 parts by weight of azoisobutyronitrile. The reaction temperature was held to between 80° to 85° C. by sub-atmospheric pressure. After about 60 minutes there was formed a syrupy, pourable prepolymerizate. After cooling to about 30° C. this was treated with 0.7 parts by weight of 25% diacetyl peroxide solution (in dibutyl phthalate) and 0.3 parts by weight of didecyl phenyl phosphite and hardened in polyethylene films between metal plates in a layer thickness of about 1 cm in a water bath at 85° C. in about 1 hour. The clear polymerizate had a viscosity number eta-i (in dimethylformamide/toluene 1:1 by volume of 0.128 dl/g and a melt viscosity index (MFI 125/2) of 9 g/10 min. The total residual monomer content was below 1.0 weight percent.

(b) Mixing To Form A Powder Varnish 100 parts by weight of the acrylic resin produced according to (a) were mixed with 13 parts by weight of dodecane-1,12-dicarboxylic acid and 60 parts by weight of very finely divided white rutile titanium dioxide (produced by the chloride process). The powder mixture was subsequently homogenized for 0.5 minute at about 120° C. in an extruder. The melt was quenched to room temperature and ground to a particle fineness below 90 microns. There resulted a powder which still had good free flowing properties at a storage temperature of 35° C.

(c) Application Of The Powder Varnish And Properties Of The Baked Varnish Films

The powder varnish was sprayed in a commercial powder spraying apparatus at a voltage of 60 kV on a 0.88 min thick defatted steel test sheet and subsequently baked for 15 minutes at 170° C. object temperature. There resulted a yellowing-free coating having the following properties:

| Loss on baking (weight percent) | 1.1 |
| Cross cut test (DIN 53151) | 0 |
| Bend test (DIN 53152) | 2mm |
| Cupping test (Erichsen) (DIN 53156) | 6mm |
| Impact test (Erichsen) (350 kg; Modell 223) | 3mm |
| Salt spray test (500 hours) (ASTM B 117-61) | Reduction in Adhesion at the Andreas cross 2mm |
| Xenotest 150, % Gloss retention after 1000 hours | 96 |

Comparison Experiment 2 (Without Addition Of Didecyl Phenyl Phosphite)

(a) Production Of An Acrylic Resin

In a mixture of 56 parts by weight methyl methacrylate, 20 parts by weight 2-ethylhexyl acrylate, 10 parts by weight of 2-hydroxypropyl methacrylate and 14 parts by weight of glycidyl acrylate there were dissolved with heating 2.0 parts by weight of glycol dimercaptoacetate. The mixture was heated to 80° C. and the polymerization started by adding 0.05 parts by weight of azoisobutyronitrile. The reaction temperature was held to between 80° and 85° C. by sub-atmospheric pressure. After about 60 minutes there was formed a syrupy, pourable prepolymerizate. After cooling to about 30° C. this was treated with 0.7 parts by weight of 25% diacetyl peroxide solution (in dibutyl phthalate) and hardened in polyethylene films between metal plates in a layer thickness of about 1 cm in a water bath at 85° C. in about 1 hour. The clear polymerizate had a viscosity number eta-i (in dimethyl formamide/toluene 1:1 by volume) of 0.128 dl/g and a melt viscosity index (MFI 125/2) of 14 g/10 min. The total residual monomer content was 1.6 weight percent.

(b) Mixing To Form A Powder Varnish 100 parts by weight of the acrylic resin produced according to (a) were mixed with 13 parts by weight of dodecan-1,12-dicarboxylic acid and 60 parts by weight of very finely divided white rutile titanium dioxide (produced by the chloride process). The powder mixture was subsequently homogenized for 0.5 minute at about 120° C. in an extruder. The melt was quenched to room temperature and ground to a particle fineness below 90 microns. There resulted a powder which already had the tendency to form clumps at a storage temperature of 35° C.

(c) Application Of The Powder Varnish And Properties Of The Baked Varnish Films

The powder varnish was sprayed in a commercial powder spraying apparatus at a voltage of 60 kV on a 0.88 mm thick defatted steel test sheet and subsequently baked for 15 minutes at 170° C. object temperature. There resulted a yellowing-free coating having the following properties:

| | |
|---|---|
| Loss on baking (weight percent) | 1.6 |
| Cross cut test (DIN 53151) | 3–4 |
| Bend test (DIN 53152) | 6 mm. |
| Cupping test (Erichsen) (DIN 53156) | 3 mm torn |
| Impact test (Erichsen) (120 kg) | 2 mm chipped off |
| Salt spray test (500 hours) (ASTM B117-61) | severe rusting underneath |

EXAMPLE 3

(a) Production Of An Acrylic Resin

In a mixture of 53 parts by weight of methyl methacrylate, 14 parts by weight of n-butyl methacrylate, 13 parts by weight of n-butyl acrylate and 20 parts by weight of glycidyl methacrylate there were dissolved with heating 3.0 parts by weight of tert. dodecyl mercaptan and 0.3 parts by weight of tributyl phosphite. The mixture was heated to 80° C. and the polymerization started by adding 0.08 parts by weight of azobisisobutyronitrile. The reaction temperature was held to between 80° and 90° C. by sub-atmospheric pressure. After about 40 to 60 minutes, there was formed a syrupy, pourable prepolymerizate. After cooling to about 30° C. this was treated with 0.7 parts by weight of 25% diacetyl peroxide solution (in dibutyl phthalate) and 0.03 parts by weight of tert butyl permaleate hardened in polyethylene films between metal plates in a layer thickness of about 1 cm in a water bath at 85° C. in about 1 hour. The clear polymerizate had a viscosity number eta-i (in dimethyl formamide/toluene 1:1 by volume) of 0.123 dl/g and a melt viscosity index (MFI 125/2) of 8 g/10 min. The total residual monomer content was below 1.0 weight percent.

(b) Mixing To Form A Powder Varnish 100 parts by weight of the acrylic resin produced according to (a) were mixed with 13 parts by weight of undecane-1,11-dicarboxylic acid and 60 parts by weight of very finely divided white rutile titanium dioxide (produced by the chloride process). The powder mixture was subsequently homogenized for 1 minute at 115° to 125° C. in an extruder. The melt was quenched to room temperature and ground to particle fineness below 90 microns. There resulted a powder which still had good free flowing properties at storage temperatures of 30° to 40° C.

(c) Application Of The Powder Varnish And Properties Of The Baked Varnish Film The powder varnish was sprayed in a commercial powder spraying apparatus at a voltage of 60 kV on a 0.88 mm thick defatted steel test sheet and subsequently baked for 10 minutes at 190° C. object temperature. There resulted a yellowing-free coating having the following properties:

| | |
|---|---|
| Loss on baking (weight percent) | 1.1 |
| Cross cut test (DIN 53151) | 0 |
| Bend test (DIN 53152) | 4 mm. |
| Cupping test (Erichsen) (DIN 53156) | 6–7 mm |
| Impact test (Erichsen) (350 kg; Model 223) | 2 mm |
| Salt spray test (500 hours) (ASTM B 117-61) | Reduction in adhesion at the Andreas cross 2 mm |

EXAMPLE 4

(c) Production Of An Acrylic Resin

In a mixture of 30 parts by weight of methyl methacrylate, 18.5 parts by weight of lauryl methacrylate, 25 parts by weight of 2-ethylhexyl acrylate, 10 parts by weight of hydroxypropyl methacrylate, and 16.5 parts by weight of glycidyl methacrylate there were dissolved with heating 2.5 parts by weight of ethylene glycol dimercaptoacetate and 0.3 parts by weight of dibutyl phosphite. The mixture was heated to 80° C. and the polymerization started by adding 0.2 parts by weight of lauroyl peroxide. The reaction temperature first rose to about 95° C. and then slowly fell again. After about 60 minutes there was formed a syrupy, pourable prepolymerizate. After cooling to about 30° C. this was treated with 0.7 parts by weight percent of 25% diacetyl peroxide solution (in dibutyl phthalate) and hardened in polyethylene films between metal plates in a layer thickness of about 1 cm in a water bath at 85° C. in about 1 hour. The clear polymerizate had a viscosity number eta-i (in dimethyl formamide/toluene 1:1 by volume) of 0.100 dl/g and a melt viscosity index (MFI 125/2) of 15 g/10 min. The total residual monomer content was 1.0 weight percent.

(b) Mixing To Form A Powder Varnish 100 parts by weight of the acrylic resin produced according to (a) were mixed with 10 parts by weight of azelaic acid and 60 parts by weight of very finely divided white rutile titanium dioxide (produced by the chloride process). The powder mixture was subsequently homogenized for 1 minute at 115° to 125° C. in an extruder. The melt was quenched to room temperature and ground to particle fineness below 90 microns.

(c) Application Of The Powder Varnish And Properties Of The Baked Varnish Film The powder varnish was sprayed in a commercial powder spraying apparatus at a voltage of 60 kV on a 0.88 mm thick defatted steel test sheet and subsequently baked for 10 minutes at 190° C. object temperature. There resulted a coating free of yellowing having the following properties:

| | |
|---|---|
| Loss on baking (weight percent) | 1.2 |
| Cross cut test (DIN 53151) | 0 |
| Bend test (KIN 53152) | 30 mm |
| Cupping test (Erichsen) (DIN 53156) | 7 mm |
| Impact test (Erichsen) (350 kg; Model 223) | 3 mm |
| Salt spray test (1000 hours) (ASTM B 117-61) | Reduction in adhesion at Andreas cross 3 mm |

EXAMPLE 5

(a) Production Of An Acrylic Resin

In a mixture of 53 parts by weight of methyl methacrylate, 8 parts by weight of n-butyl methacrylate, 17 parts by weight of n-butyl acrylate and 22 parts by the weight of glycidyl methacrylate there were dissolved with heating 2.8 parts by weight of isooctyl thioglycolate. The mixture was heated to 80° C. and the polymerization started by adding 0.1 parts by weight of azobisisobutyronitrile. The reaction temperature was held to between 80° and 90° C. by sub-atmospheric pressure. After about 60 minutes there was formed a syrupy, pourable prepolymerizate. After cooling to about 30° C. this was treated with 1.0 weight percent of 25% diacetyl peroxide solution (in dibutyl phthalate) and 0.5 parts by weight of tris (nonylphenyl) phosphite and hardened in polyethylene films between metal plates in a layer thickness of about 1 cm in a water bath at 85° C. in about 1 hour. The clear polymerizate had a viscosity number eta-i (indimethylformamide/toluene 1:1 by volume) of 0.098 dl/g and a melt viscosity index (MFI 125/2) of 11 g/10 min. The total residual monomer content was about 1.0 weight percent.

(b) Mixing To Form A Powder Varnish 100 parts by weight of the acrylic resin produced according to (a) were mixed with 12.5 parts by weight of sebacic acid, 10 parts by weight of a copolymer of 59 weight percent methyl methacrylate, 30 weight percent n-butyl acrylate and 11 weight percent acrylic acid with a viscosity number eta-i (in dimethyl formamide/toluene 1:1 by volume) of 0.100 dl/g and with 60 parts by weight of very finely divided white rutile titanium dioxide (produced by the chloride process). The powder mixture was subsequently homogenized for a maximum of 1 minute at 120° to 130° C. in an extruder. The melt was quenched to room temperature and ground to particle fineness below 90 microns. There resulted a powder which still had good free flowing properties at 30° C.

(c) Application Of The Powder Varnish And Properties Of The Baked Varnish Film

The powder varnish was sprayed in a commercial powder spraying apparatus at a voltage of 60 kV on a 0.88 mm thick defatted steel test sheet and subsequently baked for 20 minutes at 180° C. object temperature. There resulted a yellowing-free coating having the following properties:

| | |
|---|---|
| Loss on baking (weight percent) | 1.2 |
| Cross cut test (DIN 53151) | 0 |
| Bend test (DIN 53152) | 4 mm |
| Cupping test (Erichsen) (DIN 53156) | 5-6 mm |
| Impact test (Erichsen) (350 kg; Model 223) | 2-3 mm |
| Salt spray test (500 hours) (ASTM B 117-61) | Reduction in adhesion at andreas cross 2 mm |

EXAMPLE 6

(a) Production Of An Acrylic Resin

In a mixture of 32.5 parts by weight methyl methacrylate, 20 parts by weight styrene, 20 parts by weight n-butyl acrylate, 12.5 parts by weight hydroxypropyl methacrylate and 15 parts by weight glycidyl methacrylate there were dissolved with heating 2.8 parts by weight of ethylene glycol dimercaptoacetate and 1.0 parts by weight of triphenyl phosphite. The mixture was heated to 90° C. and the polymerization started by adding 0.12 parts by weight of azobisisobutyronitrile. The reaction temperature first rose to about 90° C. and then fell again slowly. After about 70 minutes there was formed a syrupy, pourable prepolymerizate. After cooling to about 30° C. this was treated with 1.2 parts by weight of 25% diacetyl peroxide solution (in dibutyl phthalate) and 0.01 parts by weight of tert. butyl peroctoate and hardened in a polyethylene film between metal plates in a layer thickness of about 1 cm in a water bath at 85° C. in about 1 hour. The clear polymerizate had a viscosity number eta-i (in dimethyl formamide/toluene 1:1 by volume) of 0.138 dl/g and a melt viscosity index (MFI 125/2) of 12 g/10 min. The total residual monomer content was below 1.0 weight percent.

(b) Mixing To Form A Powder Varnish 100 parts by weight of the acrylic resin produced according to (a) were mixed with 6 parts by weight of dodecane 1,12-dicarboxylic acid 4 parts by weight of sebacic acid and 60 parts by weight of very finely divided white rutile titanium dioxide (produced by the chloride process). The powder mixture was subsequently homogenized for 1 minute at 115° to 125° C. in an extruder. The melt was quenched to room temperature and ground to particle fineness below 90 microns. There resulted a powder which still had good free flowing properties at 35° C.

(c) Application Of The Powder Varnish And Properties Of The Baked Varnish Film

The powder varnish was sprayed in a commercial powder spraying apparatus at a voltage of 60 kV on a 0.88 mm thick defatted steel test sheet and subsequently baked for 10 minutes at 190° C. object temperature. There resulted a coating free of yellowing having the following properties:

| | |
|---|---|
| Loss on baking (weight percent) | 0.9 |
| Cross cut test (DIN 53151) | 0-1 |
| Bend test (DIN 53152) | 4 mm |
| Cupping test (Erichsen) (DIN 53156) | 5-6 mm |
| Impact test (Erichsen) (350 kg; Model 223) | 3 mm |
| Salt spray test (500 hours) (ASTM B 117-61) | Reduction in adhesion at the andreas cross 3 mm |

What is claimed is:

1. A process for the production of a glycidyl group containing acrylic resin suitable in combination with an aliphatic dicarboxylic acid as a binder in a powder varnish, lacquer or enamel comprising bulk polymerizing a mixture of monomers consisting of
   (a) 20 to 70 weight % of methyl methacrylate
   (b) 10 to 40 weight % of at least one ester of acrylic acid of methacrylic acid with a monohydric alcohol, whose homopolymer has a glass transition temperature below 40° C.
   (c) 10 to 25 weight % of glycidyl acrylate or glycidyl methacrylate and
   (d) 0 to 50 weight % of an additional ethylenically unsaturated monomer copolymerizable with (a), (b) and (c)
   the total of (a), (b), (c) and (d) being 100 weight % in the presence of a radical (free radical) catalyst and in the presence of, based on the weight of the monomer mixture, 0.1 to 3.0 weight % of at least one ester of phosphorous acid having the formula

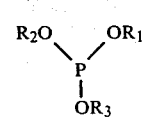

where $R_1$ is hydrogen or a saturated aliphatic hydrocarbon group with 1 to 16 carbon atoms, and aryl group with 6 to 10 carbon atoms, an alkyl substituted aryl group with 1 to 12 carbon atoms in the alkyl portion or an aralkyl group with 1 to 18 carbon atoms and $R_2$ and $R_3$ are the same or different saturated aliphatic hydrocarbon groups with 1 to 16 carbon atoms, alkyl substituted aryl groups with 1 to 12 carbon atoms in the alkyl portion, aralkyl with 7 to 18 carbon atoms or aryl groups with 6 to 10 carbon atoms.

2. A resin composition produced by the process of claim 1.

3. A composition comprising the resin composition of claim 2 together with an alkanedicarboxylic acid.

4. The composition of claim 3 wherein the alkanedicarboxylic acid has 4 to 20 carbon atoms.

5. A process according to claim 1 wherein $R_1$ is hydrogen and $R_2$ and $R_3$ are alkyl of 1 to 16 carbon atoms, phenyl, naphthyl or alkylphenyl having 1 to 12 carbon atoms in the alkyl group.

6. A resin composition produced by the process of claim 5.

7. A process according to claim 1 wherein $R_1$, $R_2$ and $R_3$ are alkyl of 1 to 16 carbon atoms, phenyl, naphthyl or alkyl phenyl with 1 to 12 carbon atoms.

8. A resin composition produced by the process of claim 7.

9. A process according to claim 7 wherein $R_1$, $R_2$ and $R_3$ are all phenyl.

10. A process according to claim 1 wherein the monohydric alcohol of ester (b) is butyl alcohol, ethyl alcohol, ethoxyethyl alcohol, methoxyethyl alcohol, isobutyl alcohol, 2-ethylhexyl alcohol, lauryl alcohol, stearyl alcohol or cyclohexanol.

11. A process according to claim 1 wherein (d) is present and is present in an amount of 3 to 50%.

12. A process according to claim 11 wherein (d) is styrene, alpha-methyl styrene, acrylonitrile, ethyl methacrylate, 2-hydroxyethyl methacrylate, 2-hydroxypropyl methacrylate, 4-hydroxybutyl methacrylate, 2-hydroxyethyl acrylate, 2-hydroxypropyl acrylate or 4-hydroxybutyl acrylate.

13. A process according to claim 12 wherein (d) is present in an amount of not over 25%.

14. The resin composition made by the process of claim 13.

15. A process according to claim 1 wherein there is employed 0.2 to 1.0% of the phosphite based on the weight of the monomers.

16. A process according to claim 15 including 0.5 to 4.0% of a vinyl polymerization chain regulator based on the weight of monomers.

17. A process according to claim 16 wherein the chain regulator is a sulfur containing organic compound.

18. A process according to claim 17 wherein the chain regulator is an alkyl mercaptan, thioglycolic acid or an ester of thioglycolic acid with a mono to tetrahydric alcohol.

19. A process according to claim 16 wherein there is employed 1.5 to 2.5% of the chain regulator.

20. A process according to claim 16 wherein there is employed 0.2 to 1.0% of the phosphite based on the weight of the monomers.

21. A varnish, lacquer or enamel composition including the resin composition of claim 2 in powder form and and an alkanedicarboxylic acid having 4 to 20 carbon atoms.

22. A composition according to claim 21 including a pigment.

23. A powder composition according to claim 22 wherein the pigment includes titanium dioxide.

24. The composition of claim 4 wherein the alkanedicarboxylic acid has 7 to 14 carbon atoms and the ratio of the total glycidyl groups in the acrylic resin to the total carboxyl groups in the alkane dicarboxylic acid in the composition is between 0.8 and 1.4 to 1.

* * * * *